(12) United States Patent
Tellenbach et al.

(10) Patent No.: US 7,516,035 B2
(45) Date of Patent: Apr. 7, 2009

(54) METHOD FOR THE ADAPTIVE CORRECTION OF DRIFT PHENOMENA IN A FORCE-MEASURING DEVICE, AND FORCE-MEASURING DEVICE

(75) Inventors: Jean-Maurice Tellenbach, Hettlingen (CH); Daniel Reber, Madetswil (CH)

(73) Assignee: Mettler-Toledo AG, Greifensee (CH)

( * ) Notice: Subject to any disclaimer, the term of this patent is extended or adjusted under 35 U.S.C. 154(b) by 20 days.

(21) Appl. No.: 11/471,637

(22) Filed: Jun. 21, 2006

(65) Prior Publication Data

US 2007/0010960 A1    Jan. 11, 2007

(30) Foreign Application Priority Data

Jun. 21, 2005    (EP)    ................................... 05105422

(51) Int. Cl.
*G06F 3/00*    (2006.01)

(52) U.S. Cl. ........................ 702/105; 702/102; 702/173; 702/176

(58) Field of Classification Search ................... 702/62, 702/64, 105, 150, 178, 188, 101, 173, 182, 702/102, 176; 73/1.4; 177/4, 25.14, 25.4; 340/442; 701/1
See application file for complete search history.

(56) References Cited

U.S. PATENT DOCUMENTS

| | | | |
|---|---|---|---|
| 4,691,290 A | * | 9/1987 | Griffen ........................ 702/173 |
| 4,836,308 A | * | 6/1989 | Davis et al. .............. 177/25.14 |
| 4,974,679 A | * | 12/1990 | Reuter ..................... 177/210 R |

(Continued)

FOREIGN PATENT DOCUMENTS

EP    0 670 479 A1    9/1995

(Continued)

OTHER PUBLICATIONS

"Bauen Sie Ihre Qualität Auf Solidem Grund" (Build Your Quality on Solid Ground), company publication, Mettler Toledo GmbH, Jan. 2001, pp. 2-28, (cited in specification).

(Continued)

*Primary Examiner*—Eliseo Ramos Feliciano
*Assistant Examiner*—Felix E Suarez
(74) *Attorney, Agent, or Firm*—Buchanan Ingersoll & Rooney PC

(57) ABSTRACT

A method serves to correct drift phenomena, in particular creep effects, occurring in an electronic balance that has a measuring transducer through which a measuring signal is formed which is representative of a load applied to the force-measuring device. The measuring signal is delivered by way of an analog/digital converter to a signal-processing unit that is supported by at least one processor, said signal-processing unit being capable of compensating drift deviations, for which purpose the signal-processing unit, via the processor, accesses drift parameters that are stored in a memory unit and serve as basis for calculating a time-dependent correction value by which the drift error of the measuring signal (ms) is corrected. At time intervals that are either controlled automatically or chosen by the user, new optimized values for the drift parameters are determined automatically by the processor and the signal-processing unit under the control of an optimization program that is stored in the memory unit, and the new optimized values are filed in the memory unit.

21 Claims, 5 Drawing Sheets

U.S. PATENT DOCUMENTS 5,308,931 A * 5/1994 Griffen .................... 177/25.14
5,606,516 A * 2/1997 Douglas et al. ............. 702/104

FOREIGN PATENT DOCUMENTS

EP  0 945 717 A1  9/1999
WO  03/078937 A1  9/2003

OTHER PUBLICATIONS

"Wägefibel" (Weighing Primer), Mettler Toledo GmbH, Apr. 2001, pp. 1-20 (cited in specification).

European Search Report (with English translation of category of cited documents) dated Nov. 7, 2005.

* cited by examiner

METHOD FOR THE ADAPTIVE CORRECTION OF DRIFT PHENOMENA IN A FORCE-MEASURING DEVICE, AND FORCE-MEASURING DEVICE

RELATED APPLICATIONS

The present application claims priority under 35 U.S.C. §119 to European Application No. 05105422.9 filed Jun. 21, 2005, the contents of which are hereby incorporated by reference in their entirety.

BACKGROUND

A method for correction of drift phenomena in an electronic force-measuring device is disclosed. A force-measuring device is disclosed that is suitable for performing the method, in particular a balance.

In electronic force-measuring devices, particularly in balances, there are a variety of component elements that have to meet stringent requirements in regard to their mechanical properties. For example, particularly important for the precision of the balance are load cells with their guiding mechanisms, coupling elements and pivot elements, or force/displacement transducers with appurtenant sensor devices, e.g. strain gauges connected in a measuring bridge circuit. In a force/displacement transducer the linearity of the relationship between force and displacement is important, wherein the aim is for reproducible elastic properties. As described in [1], EP 0 945 717 A1, the requirements are for the an elasticity, the creep behavior, and the (mechanical) hysteresis to be as small as possible. In addition, the elements are required to be corrosion-resistant and preferably non-magnetic.

Although significant improvements have been achieved in the properties that are relevant for the precision of a balance, undesirable drift phenomena remain an issue of concern, in particular the so-called creep behavior, i.e. a change in the measuring result within the time interval of a measurement.

Other properties of a balance which determine the accuracy of a measurement besides creep and hysteresis, namely linearity, freedom from eccentric load errors, repeatability, temperature stability, settling time of transient oscillations, and resolution, are described for example in [2], "Bauen Sie Ihre Qualität auf solidem Grund!" (Build your Quality on Solid Ground!), company publication, Mettler Toledo GmbH, January 2001.

Determining factors for the accuracy of a measurement in a balance are described in [3], "Wägefibel" (Weighing Primer), Mettler Toledo GmbH, April 2001. As discussed in this reference, the accuracy of a balance depends on physical influence factors such as the effects of heat, moisture absorption or moisture release, electrostatic or magnetic interaction with the environment. It is therefore important that the location where the balance is set up is chosen so that undesirable physical influences are avoided. Furthermore, the operation of the balance, for example the level adjustment and the correct procedure for putting the balance into operation, the arrangement of the draft-protection elements, the selection of an appropriate weighing container, and the positioning of the load on the weighing pan are of critical importance for the measurement accuracy. Thus, the influence factors and effects as described here determine the state of the balance, i.e. the conditions on which the measurement accuracy depends.

Some of these extraneous influence factors which affect the measurement accuracy, or measurement deviations that are caused by the properties and the behavior of the balance, can be compensated through regulation techniques. However, there are some unfavorable conditions of a balance which are caused for example by vibrations, or by air drafts in the absence of a draft shield, where the influence factors or the resultant measurement error cannot be corrected.

A balance in which the drift phenomena caused by creep are corrected by a compensation for the drift-related components is disclosed in [4], U.S. Pat. No. 4,691,290. In the method that is used in this balance, a representation of the measured load and the status of the creep are determined and combined with each other in order to arrive at a measurement value that corresponds to the applied load, wherein the creep-related error components are compensated.

Furthermore, according to [4] the mathematical representation of the status of the creep is determined as a function of time, of the load being measured, and of the creep status that was determined at an immediately preceding time, in order to take factors into account that affected the balance previously.

All of references [1] to [4] are hereby incorporated by reference herein in their entireties.

The creep status in this balance is calculated based on constants that were determined and stored in the initial adjustment of the balance. According to [4], these constants need to be determined individually for each balance, because there are in most cases variations between different balances.

In spite of the measures described above to improve the drift behavior of balances, it has been found that undesirable drift phenomena can still occur.

SUMMARY

A method for correction of drift phenomena in an electronic force-measuring device is disclosed. The method can be used for operating a force-measuring device, such as a balance.

An exemplary method serves to correct drift phenomena that are caused by extraneous influence factors and/or by device properties and behaviors of an electronic force-measuring device, particularly a balance with a measuring transducer that produces a measuring signal representing the magnitude of an applied load and delivers the signal by way of an analog/digital converter to a processor-based digital signal-processing unit which has the capability to compensate for drift deviations and which for this purpose has access to drift parameters that are stored in a memory unit and provide the basis for calculating a time-dependent correction value and for correcting the drift error of the measuring signal.

For example, a program routine is performed automatically or initiated by the user in regular or random time intervals, wherein new, optimized values for the drift parameters are automatically determined and stored in the memory unit by means of the processor and the signal-processing unit based on an optimization program that is stored in the memory unit.

Exemplary embodiments are based, in part, on a discovery that drift phenomena in electronic balances are not exclusively dependent on changing influences of the environment and on the drift behavior that was measured at one time for the component elements of the balance described hereinabove. It was found that the drift phenomena occurring in balances can also show a significant dependence on changes in the drift behavior of the afore-described component elements, which take place in the course of operating the balance over an extended period of time. Rather than tolerating the existence of the drift phenomena or having them eliminated by sending the balance back to the factory, the drift phenomena that slowly manifest themselves after the initial adjustment and delivery of the balance can be corrected adaptively in exemplary balances described herein.

New values for the drift parameters can be determined by using the currently stored values of the drift parameters as well as currently and/or previously stored measurement data, test data and/or calibration data.

In a first exemplary embodiment, a non-corrected or only partially corrected time graph of the amplitude or a corresponding table of amplitude/time value pairs of the measurement signal, i.e., a time profile of the measurement signal is recorded at the current time. If the balance is in a suitable operating state, the user can initiate an exemplary method as described herein and subsequently accept the replacement of the previous values by the new values of the drift parameters that were optimized by the optimization program on the basis of the currently recorded signal profile. For example, a calibration weight can be set on the balance either by the user or automatically, and a time profile of the weighing signal can be recorded based on which the method is to be performed. After a load measurement has taken place, the optimization program signals that a drift has been found and that the balance is in a suitable condition to perform the optimization. The user can respond to the signal by confirming that the condition of the balance is suitable for performing the optimization and that the optimization method is to be carried out. Thus, the division of tasks between the optimization program and the user can be either fixed in a desired way or flexibly selected. If a multitude of drift parameters is to be optimized precisely, this can put a burden on the user which can be avoided by the measures described herein.

According to further exemplary embodiments, non-corrected or only partially corrected time graphs of the amplitude or corresponding tables of amplitude/time value pairs of the measurement signal, i.e., time profiles of the measurement signal, are recorded in the performance of measurements during normal operation of the balance, in test processes and/or in calibration processes. The data of the signal profiles can be stored together with their respective time information (date and/or time). The analog or already digitized signal profile that is to be stored should not yet be processed in regard to the drift phenomenon that is to be corrected and for which the drift parameters are to be optimized at a later point in time. However, it is possible and makes sense to process the signal profile in other respects, for example by filtering the signal. If the drift parameters are to be compensated for drift phenomena that are based on creep effects, the processing can include the compensation of, e.g., hysteresis effects, linearity deviations, effects that are caused by the intervention of the user, or temperature effects. Thus, the drift deviation caused by creep effects is put more sharply in evidence, so that the effect of the drift parameters, in particular the step-wise change of the drift parameter values can be seen more precisely and the optimization process can be performed better and faster.

As the drift properties of a balance change only slowly, it makes sense to perform the method only in appropriately large time intervals. For example, the method according to the invention can be performed periodically in intervals of n months (for example n=2). The exemplary method can also be initiated by the user as needed. In one exemplary embodiment, the magnitude of the currently occurring drift phenomena is determined and compared to a corresponding threshold value, whereupon the method described herein can be performed if the threshold was found to be exceeded.

For the optimization of the values of the drift parameters, at least some of the previously registered signal profiles are retrieved from the memory unit and entered sequentially into the digital signal-processing unit in which the correction of the drift phenomena is performed on the basis of new values for the drift parameters, whereupon the corrected signal profiles are evaluated and the optimized drift parameter values are stored in memory. This variant of the method is particularly advantageous, as optimized values for the drift parameters can be determined rapidly, precisely, and without the involvement of the user. Sufficient computing capacity and memory space, can for example, be provided in an electronic or magnetic storage medium. The exemplary method can further be performed during time periods when no other applications are being performed. Furthermore, the method can be terminated or interrupted if the operator wants to use the balance for measurements.

Starting from the current values for the drift parameters, the time profiles of the signals are for example evaluated by making stepwise changes in these parameters and then calculating for each step—possibly after averaging the measurement results—a test value that reflects the goodness of the correction. In other words, the values of the drift parameters are changed in small steps within a range that is considered to be practical, whereupon the non-corrected signal profiles for each evaluation step are processed with the appropriate drift parameters and converted into corrected signal profiles and then evaluated. The test values found in each evaluation step are subsequently compared to each other, whereupon the values for the drift parameters with the best test value are stored in memory as new current values for the drift parameters.

The optimization of the drift parameters through these measures will be successful if the recorded signal profiles are based on a non-disturbed behavior of the balance and stable measurement conditions. However, if the method is performed with signal profiles that are influenced by disturbances, reduced improvement may be achieved by running an exemplary method.

Therefore, in yet a further exemplary embodiment, characteristic traits in the condition of the balance which occur as a result of extraneous influences and/or characteristic traits in the recorded signal profiles are determined, whereupon based on the characteristic traits in the condition of the balance and/or in the signal profiles, the signal profiles are evaluated with regard to their suitability, and data that are found unsuitable for the optimization of the drift parameters are dropped from further consideration.

For example, data that are dropped from further consideration include:
a) data associated with a time at which deviations from the normal operating mode of the balance were recorded,
b) data associated with periods when extraneous disturbances were recorded, such as mechanical vibrations, increased atmospheric humidity, irregularities in the line power supply, disturbances caused by air drafts that were either dependent or independent of the load or the measuring object, or temperature-related disturbances,
c) data for which load changes were registered that were possibly caused by release or absorption of moisture during the measurement, which may have been determined based on asymmetric drift profiles during application and removal of the load, and/or
d) data for which disturbances due to previous measurement applications were registered.

Yet, accordingly to a further exemplary embodiment, at least one time profile of non-compensated drift values is recorded over the entire operating time of the balance, and a time profile of compensation values associated with the non-compensated drift values is updated and used accordingly for the correction of drift phenomena. For example, an additional compensation component can be determined by an extrapolation of the profile of compensation values and used as supplemental reference data subsequent to the last-performed optimization.

BRIEF DESCRIPTION OF THE DRAWINGS

Details of the exemplary methods for adaptive correction of drift phenomena and exemplary force-measuring devices are set forth in the description of the embodiments in conjunction with the drawings, wherein.

DETAILED DESCRIPTION

Figures 1, 2:
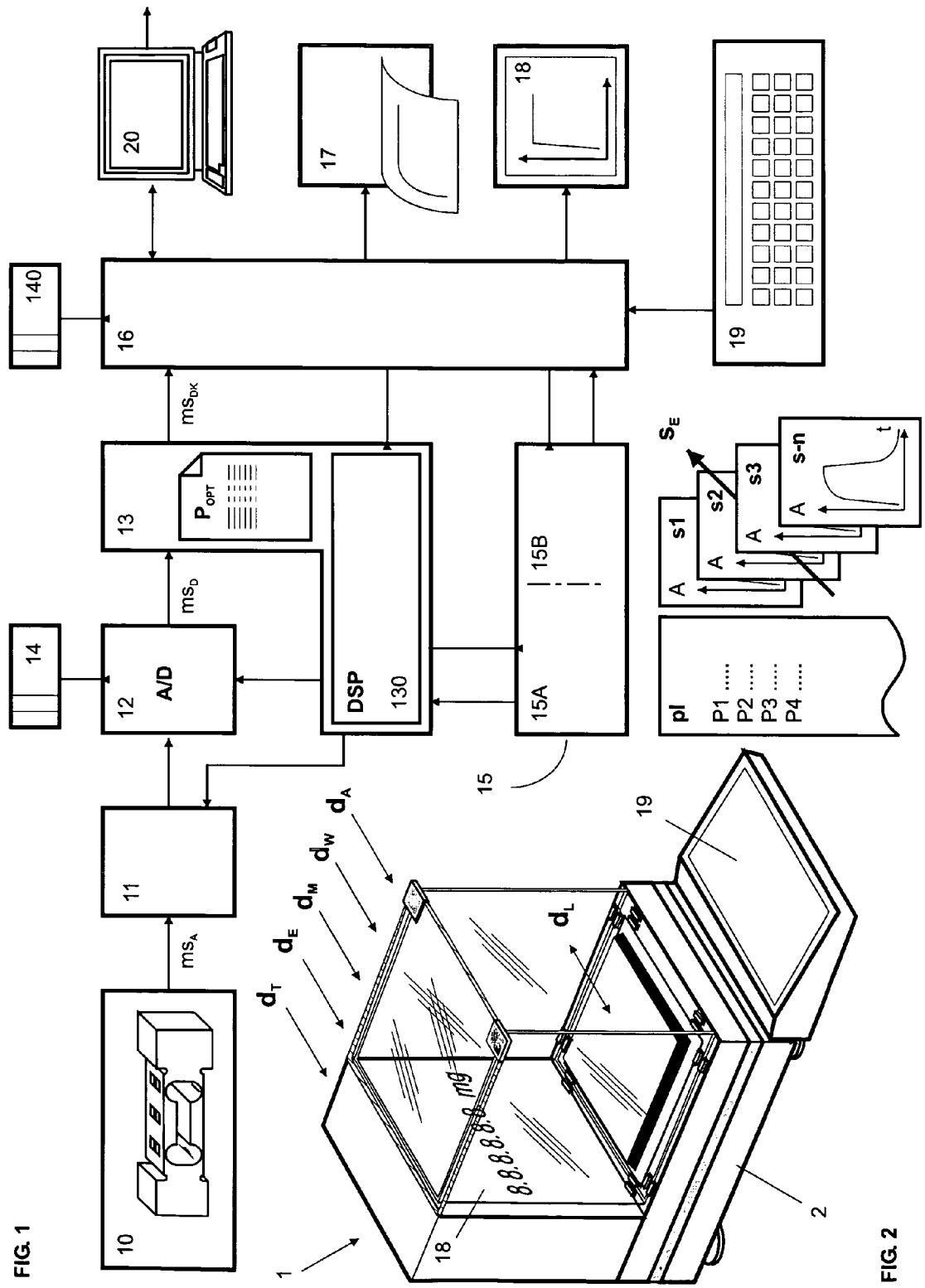
FIG. 1 represents a exemplary block diagram of the balance 1, with a digital signal-processing unit 13 and a signal processor 130 which, based on an optimization program $P_{OPT}$, has the capability to perform a method as disclosed herein.
FIG. 2 represents an exemplary balance 1 with symbolically represented influence factors $d_A$, $d_E$, $d_W$, $d_T$, $d_L$, which can individually or in combination cause a disturbance in the signal profile of the measurement signal $ms_A$.
Figure 3:
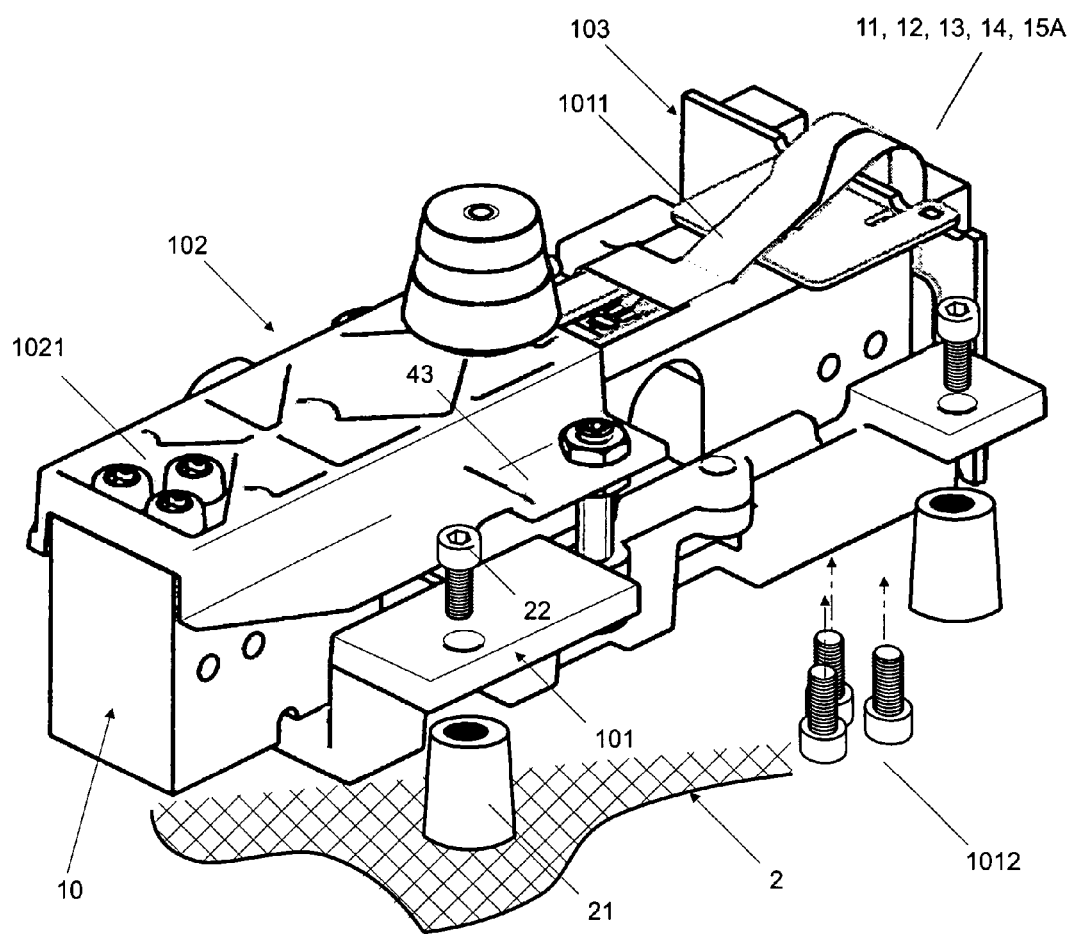
FIG. 3 represents an exemplary measurement transducer 10 including components provided for its operation which are suitable for carrying out an exemplary method for adaptive correction of drift phenomena in a force-measuring device.

FIG. 1 represents the block diagram of an exemplary balance 1 that is illustrated as an example in FIG. 2, which has a measurement transducer 10, for example the force-measuring cell described in [5] (the disclosure of which is hereby incorporated by reference herein in its entirety) and illustrated in FIG. 3, having a transducer body 10 that is connected by means of screws 1021, 1012 to a weighing pan carrier 102 and to a mounting part 101 which, in turn is connected to the housing 2 of the balance 1 by means of screws 22. The strain gauges are connected by way of a flat-ribbon cable 1011 to a circuit module 103 on which the modules 11, 12, 13, 14, 15A are arranged which will be described in more detail below and which serve for the signal correction among other functions. The modular force-measuring cell which is shown in FIG. 2 as an example has special advantages which are described in reference [5]. However, the method can also be realized with any other design structure of the balance.

An analog measuring signal $ms_A$ representing a load is delivered by the measurement transducer 10 by way of a first signal-processing unit 11 serving to process analog signals to an analog/digital converter 12 which produces the digitized measuring signal $ms_D$ and passes it on to a second signal-processing unit 13 serving to process digital signals, in which the digitized measuring signal $ms_D$ is corrected on the basis of drift parameters P1, P2, ... in such a way that drift phenomena, in particular signal deviations caused by creep, are compensated. To perform this function, the second signal-processing unit 13 is equipped with a processor 130, preferably a signal processor, and connected to a memory unit 15, more specifically 15A. To perform the method, an optimization program $P_{OPT}$ is executed by the signal processor 130 which is stored in the memory unit 15 as well as the listings pl with the drift parameters P1, P2, ... and recorded signal profiles s1, s2, ....

The corrected digital measuring signal $ms_{DK}$ is delivered from the second signal-processing unit 13 to a main processor or host processor 16 which is connected to the memory unit 15, 15B, to an entry unit 19, for example a keyboard, to a display 18, for example a liquid crystal display, to a printer 17 and to a central computer 20. The division of tasks between the processors 130 and 16 in the execution of the method can be based on an arbitrary decision. In principle, only one processor is strictly required. Accordingly, the memory areas 15A, 15B of the memory unit 15 are either divided in their tasks or used in common. The signal processor 130 can, e.g., perform only individual process steps under the control of the host processor 16 and pass the results on for further processing.

FIG. 1 further shows that the signals which describe the condition of the balance 1 and/or extraneous influence factors can be sent from sensors 14 by way of the analog/digital converter 12 to the signal processor 130 and directly from sensors 140 to the host processor 16.

FIG. 1 further shows time profiles of exemplary signals s1, ..., s-n, which are registered in the memory unit 15; 15A, for example in a ring buffer in said memory unit, either in the form of continuous amplitude profiles as functions of time or as value pairs of amplitude and time, for example, together with their identifying time- and/or date information. The signal profiles s1, ..., s-n are not corrected or are corrected only partially, so that they provide unaltered information about the measuring process and the measurement device. The stored signal profiles s1, ..., s-n can serve for the optimization of the balance 1 at a later time rather than for the result evaluation by the user which normally occurs in parallel immediately after a measurement or weighing process has been concluded.

As an example, signal profiles s1, ..., s-n that are not compromised by one or more of the interference effects $d_A$, $d_E$, $d_M$, $d_W$, $d_T$, $d_L$ shown symbolically in FIG. 2 are used for the optimization of the balance 1. For example, an electrical disturbance dE was registered in the recording of the signal profile s2; therefore the signal profile s2 is not used for the optimizing process and may in some cases not even be stored in memory. The identifying time data stored with each of the signal profiles s1, ..., s-n provides for example the possibility to monitor the aging or to indirectly check the quality of the signal profiles s1, ... s-n. Signal profiles s1, ..., s-n which have already been taken into account in a previous optimization of the balance are for example erased from the memory unit 15. Signal profiles s1, ..., s-n which were initially qualified as usable and were stored, can still be rejected later if several other disturbances are found to have occurred at the registered time of a signal profile. For example, an alert can be sent from a central computer 20 to the balances installed at decentralized locations that on a given date mm/dd/yyyy, an electrical disturbance occurred between the times HH:MM and hh:mm whereby different systems were detrimentally affected. Signal profiles s2 that fall into this time frame and are therefore suspect can thus be rejected in the balance 1.

As an example, FIG. 2 shows an embodiment of a balance 1 that is suitable to perform the method as disclosed herein, where the components 10, 11, . . . shown in FIG. 1 are integrated in a housing 2 of the balance 1.

Symbolically shown are a number of influence factors $d_A$, $d_E$, $d_M$, $d_W$, $d_T$, and $d_L$ (not representing a complete list) which determine or at least affect the condition of the balance 1 and the measurement behavior of the balance 1, more specifically the dynamic properties of a measurement.

Attention is given to the influence factors $d_A$ coming from the user, i.e. the settings made on the balance 1 and the applications being performed which determine the current condition of the balance 1 and its behavior. Of significance are for example process parameters selected by the user for the signal processing, or the opening of a door that serves to close off the weighing compartment. Further of significance is the history of the previously performed applications or measurements, as is described in [4].

Of further interest are the influence factors $d_E$ of the line power supply as well as interference from electrical fields, mechanical effects such as vibrations, thermal effects $d_T$, environmental factors $d_W$, for example air drafts and humidity, as well as the behavior $d_L$ and properties of the measured load. Also of interest are interactive effects between the load and the environment. For example, a weighing load can release moisture to the environment or absorb moisture from the environment. Furthermore, a continuous heat exchange takes place between the weighing load and the environment, whereby undesirable convective air currents can be caused. The release or absorption of moisture or the convection caused by heat exchange can lead to errors in the indicated weight which are superimposed on a drift that is caused by creep effects. If the creep-related drift of the balance is compensated correctly, there remains a drift component caused by a change in the load, which should not be interpreted as creep for the optimization steps which will be described below. If a change in the indication by one or more units is not caused by creep but by a change in the weighing load or other factors, this needs to be noted and the associated signal profile s-x needs to be rejected.

The evaluation of the signal profiles s1, . . . , s-n can be performed by identifying and evaluating of factors that are characteristic for the condition of the balance insofar as it depends on influence factors coming from the user or from the environment, and/or by identifying and evaluating of characteristic signal profile traits which are extracted from the signal profiles s1, . . . , s-n.

The condition of the balance can encompass all elements that have an influence on a measurement application from which a signal profile s is obtained. In particular, the condition of the balance is determined not only by operation-related settings made by the user but also by the weighing load placed on the balance and by the environment.

With few exceptions, a drift that is not caused by creep effects in a measuring process can now be determined from the characteristics of the balance condition and/or from the characteristics of the signal profile.

For example, the humidity and the temperature of the ambient air are measured. Furthermore, information which, e.g. specifies the measuring object as being a liquid may be entered by the user. Based on these characterizing factors, a load change that is to be expected due to the evaporation of liquid can be calculated or an associated risk can be taken into account.

If the temperature of the ambient air and the temperature of the weighing load are measured, a drift that will be caused by air convection can be predicted whose magnitude will decrease until the temperatures are equalized.

However, equivalent or supplemental information can also be obtained by the measurement of signal profile characteristics. For load changes that occur as a result of moisture release, one normally observes a linear drift, while the drift that is associated with creep will rather tend towards an exponential time profile.

The respective drift profiles when applying and removing a load are normally symmetric in the case of creep while a drift caused by a change in the load disappears completely after the load has been taken off the balance. Therefore, although the signal profile characteristics are in most cases more difficult to determine from the signal profiles s, the determination is especially valuable in regard to assessing whether the signal profiles are usable.

According to an exemplary embodiment, the stored signal profiles s1, s3, . . . Are used for the optimization of the balance 1. The balance 1 can be optimized not only by a manufacturer in the original adjustment of the balance 1, but also repeatedly by the user. In the optimization process, drift parameters P1, P2, . . . are defined which serve as a basis for correcting drift deviations. The concept of making a one-time selection of static drift parameters P1, P2, . . . and the correction of drift deviations are known from reference [4]. These drift parameters P1, P2, . . . can be reexamined repeatedly after the installation of the balance 1 at the user location and adapted to changes in the properties of the balance 1. In some cases, the drift parameters are checked again and/or are presented to the user for acceptance before starting an application.

Figure 4:
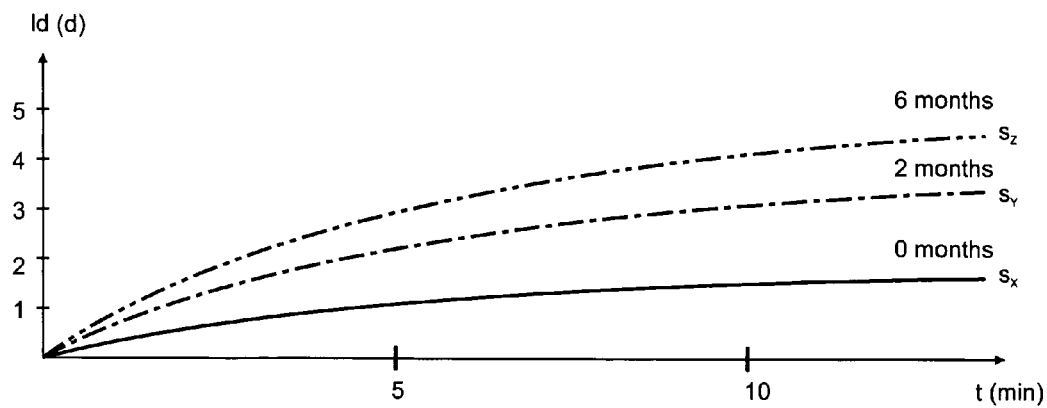
FIG. 4 represents exemplary non-corrected drift profiles recorded at time intervals of several months.

FIG. 4 illustrates exemplary changes in the creep-related drift behavior of the balance 1. The graphs which were recorded in time intervals of several months show uncorrected drift profiles $s_x$, $s_y$, $s_z$ which occur after placing a load on the balance. The curves indicate the changes in digits or display units which are observed in the display within a time frame of 15 minutes. This illustrates that the creep-related drift behavior of the balance 1 changes over time.

Figure 5:
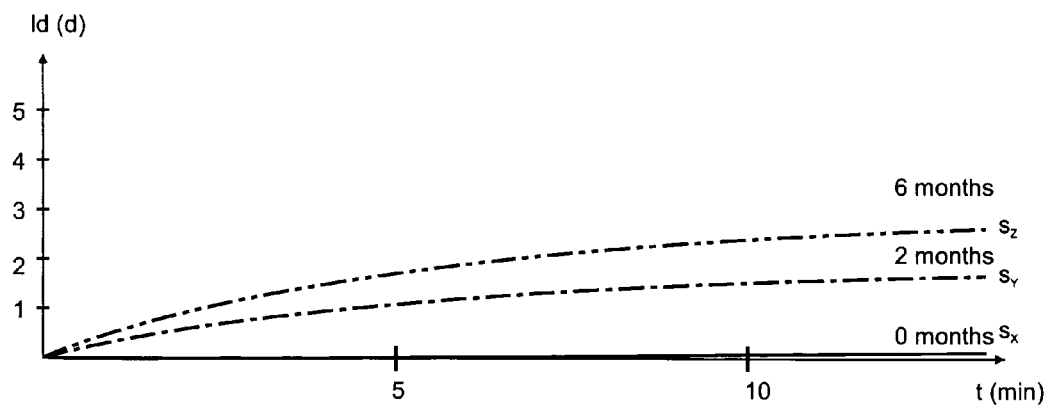
FIG. 5 represents exemplary drift profiles recorded at time intervals of several months, which were corrected by means of drift parameters that were fixedly set at one time.

If the drift deviations were compensated correctly on the basis of the static drift parameters P1, P2, . . . in the original adjustment, this will result in the corrected drift profiles $s_x$, $s_y$, $s_z$ which are shown in FIG. 5. The first profile $s_x$ at 0 months shows practically no drift. However, because of changes in the instrument properties, undesirable drift components will show up again after the illustrated intervals of two months and six months, respectively, which are corrected in accordance with the method described herein.

The exemplary methods can be initiated for example automatically in fixed time intervals, automatically after undesirable drift deviations have been found, or manually by the user.

Figure 7:
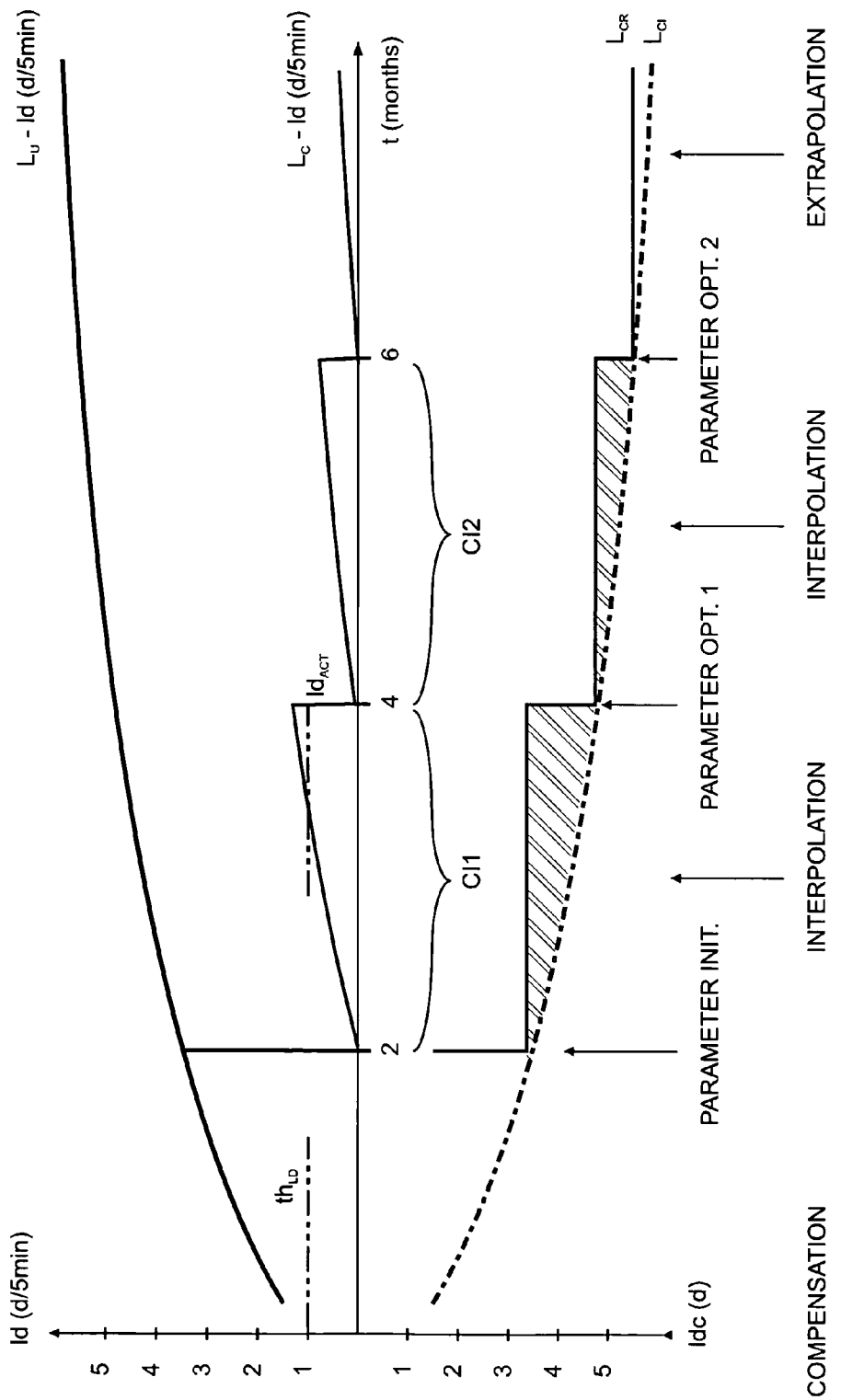
FIG. 7 represents exemplary time profiles $L_U$, $L_C$, extrapolated over several months, of the compensated and non-compensated drift components which occur as a result of creep within five minutes after a load has been applied, as well as the actual profile $L_{CR}$ of the correction values that were adapted according to the invention, and the extrapolated profile of ideal correction values.

For example, the magnitude $ld_{ACT}$ of currently occurring drift phenomena is determined on the basis of the stored signal profiles s1, . . . , s-n and compared to an associated threshold value $th_{LD}$, and after the threshold value $th_{LD}$ has been found to be exceeded, the method for optimizing the drift parameters P1, P2, . . . is carried out (see FIG. 7).

For the optimization of the values of the drift parameters P1, P2, . . . at least individual ones of the previously registered signal profiles s1, s3, . . . are retrieved from the memory unit 15 and sequentially entered into the signal-processing unit 13 in which the correction of drift phenomena takes place based on new values for the drift parameters P1, P2, . . . , whereupon the corrected signal profiles s1, s3, . . . are evaluated and optimized values for the drift parameters P1, P2 are stored in memory. For example, the uncorrected signal profile recorded after six months as shown in FIG. 4 is retrieved from the memory unit 15 and entered into the signal-processing unit 13, in which the correction method is executed based on the current drift parameters P1, P2, . . . Starting from the profile shown in FIG. 5, the signal profile is varied by changing the drift parameters P1, P2, . . . until an optimal profile has been found. For example, a stepwise examination is made of the signal profiles s1, . . . , s-n starting from the current values for the drift parameters, wherein for each step of the examination a test value is calculated, possibly after averaging the measuring results, as a measure for the goodness of the correction that has been achieved. The test values that were determined for each step of the examination are subsequently compared to each other, whereupon the values for the drift parameters P1, P2, . . . associated with the best test value are stored in memory as the new current values.

Figure 6:
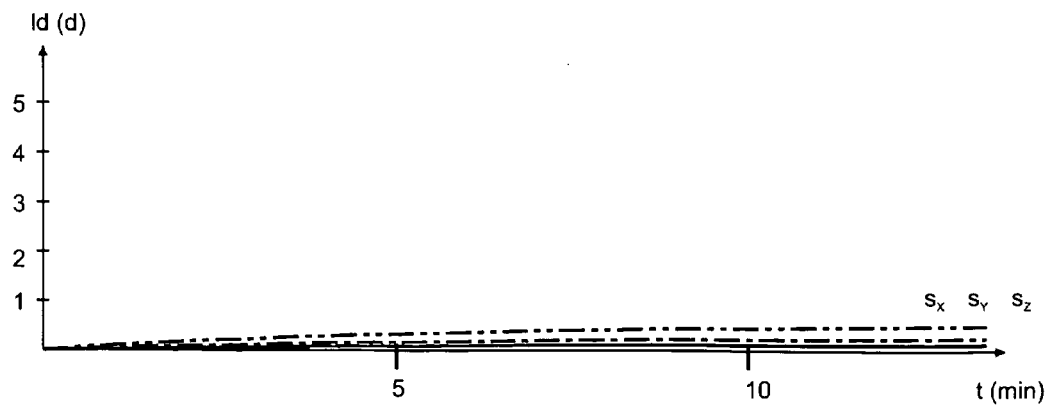
FIG. 6 represents exemplary drift profiles recorded at time intervals of several months, which were corrected by means of adaptively updated drift parameters.

FIG. 6 shows exemplary signal profiles $s_x$, $s_y$, $s_z$, corresponding to the signal profiles of FIG. 4 after a practically complete correction by means of individually adapted drift parameters P1, P2, . . . .

To supplement the foregoing explanation, another aspect of the exemplary method is disclosed. A curve $L_U$ is shown which represents the uncompensated creep-related drift behavior or, more specifically, the change over several months in the drift values that occur five minutes after placing a load on the balance. The curve $L_U$ was recorded through sequential measurements and interpolation of the measurement values.

The curve $L_{CR}$ shows the stepwise change of the compensation values that are adapted in intervals of two months based on the adaptively adjusted values of the drift parameters P1, P2, . . . The sawtooth-shaped curve $L_C$ illustrates the creep-related drift behavior of the balance 1 which has been optimally corrected at specific points within intervals CI1, CI2, . . . on the basis of the compensation values $L_{CR}$.

Also shown is a threshold value $th_{LD}$ as provided in preferred embodiments of the invention, which threshold corresponds to a maximally tolerable drift deviation and, when it has been exceeded, represents the criterion for carrying out the method described herein. As a result, the method is in each case executed no sooner than necessary and as late as possible.

Also drawn in the graph of FIG. 7 is an exemplary curve $L_{CI}$ which was determined by interpolation and extrapolation which gives an approximation of the ideal compensation values. The extrapolated part of the curve can be used for the optimization of the sawtooth-shaped curve $L_C$ and thus for the further optimization of the drift behavior of the balance 1.

Figure 8:
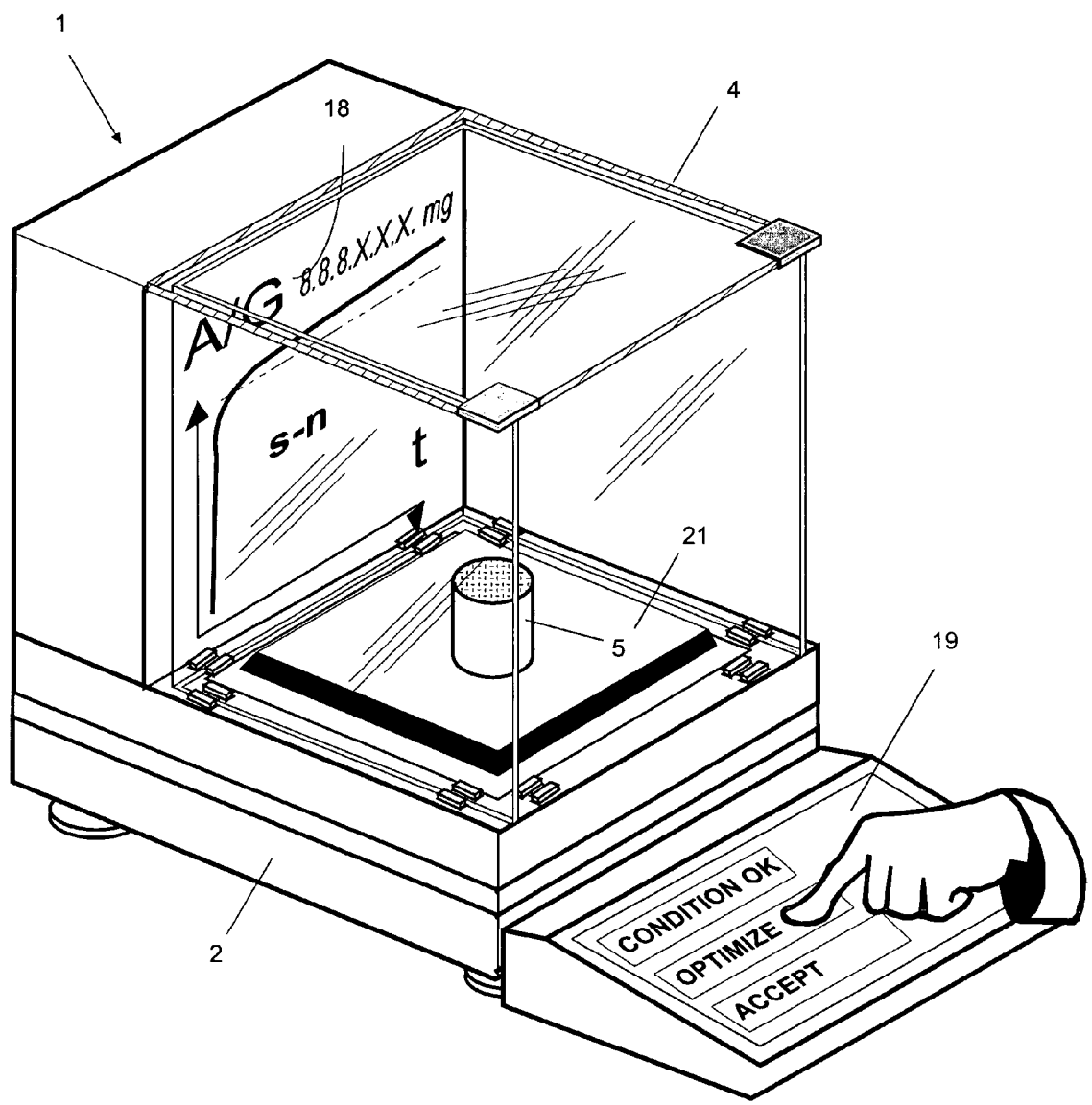
FIG. 8 represents an exemplary balance 1, which has the capability to perform the method as disclosed herein, either automatically or semi-automatically.

FIG. 8 illustrated the exemplary balance 1 of FIG. 2 in a design configuration that is suitable for the automatic or semi-automatic execution of the method described herein.

A load 5 has been placed by the user on the weighing pan 21 of the balance 1 and left there for an extended time period. The display 18, for example a liquid crystal display screen, indicates the signal profile s-n as registered during the time period t, from which the presence of a drift can be concluded.

In a balance with at least one automatically actuated calibration weight, the foregoing process can also be performed without the assistance of the user.

The user can now enter through the keyboard 19 that the balance is in a suitable condition to perform the optimization method. With a further press of a key, the user can start the optimization method and later, again by pressing a key, accept the optimized values for the drift parameters P1, P2, . . . .

If the adjustment weight is placed on the balance automatically, there is also the alternative possibility for the optimization program to detect a drift automatically and to start the optimization method automatically, whereupon optimized values for the drift parameters P1, P2, . . . are stored either automatically or only after the user has confirmed them to replace the previous parameter values.

Thus, the values for the drift parameters P1, P2, . . . can be optimized with the balance 1 shown in FIG. 8 based on a current recorded signal profile s-n. Alternatively, the balance 1 can also be designed for the automatic optimization of the values for the drift parameters P1, P2, . . . by means of signal profiles s1, . . . , s-n that were previously registered. The user again has the possibility for each signal profile s that is to be stored and to be used later to confirm that the condition of the balance is suitable (see key or entry field <CONDITION OK>), to start the optimization method (see key or entry field <OPTIMIZE>) and to accept the optimized values for the drift parameters P1, P2, . . . as replacements for the previous parameters (see key or entry field <ACCEPT>).

The exemplary methods and the exemplary force-measuring devices 1 have been described and illustrated as various exemplary embodiments. The force-measuring device has been described in the form of an exemplary balance 1. However, exemplary embodiments can also be used in other force-measuring devices such as gravimetric measuring devices, weighing modules, load cells and force sensors which may in some cases constitute part of a balance. The exemplary methods can be used in many ways and are not limited to the explicitly named factors which can cause drift phenomena. Of course, the exemplary methods are furthermore not limited to a specific selection, configuration, grouping and application of the drift parameters P1, P2, . . . .

For the memory storage of signal profiles s1, . . . , s-n, a variety of centralized or decentralized arrangements of storage media can be used, such as for example recording devices with magnetic or optical means for writing and reading as well as static or dynamic semiconductor memories.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

Literature References

[1] EP 0 945 717 A1
[2] "Bauen Sie Ihre Qualität auf solidem Grund!" (Build your Quality on Solid Ground!), company publication, Mettler Toledo GmbH, January 2001
[3] "Wägefibel" (Weighing Primer), Mettler Toledo GmbH, April 2001
[4] U.S. Pat. No. 4,691,290
[5] WO 03/078937 A1

What is claimed is:

1. A method for correction of drift phenomena in an electronic force-measuring device that includes a measuring transducer, the method comprising:

receiving a measuring signal from the measuring transducer, said measuring signal representing a load applied to the force-measuring device, said measuring signal being received by a signal-processing unit that is supported by at least one processor and serves to process digital signals, and said signal-processing unit being adapted to compensate for drift deviations;

calculating a time-dependent correction value by which the drift error of the measuring signal is corrected based on stored drift parameters accessed by the processor from a computer-readable memory unit, the processor and the signal-processing unit being under the control of an optimization program that is stored in the memory unit, wherein:

at time intervals that are either controlled automatically or chosen by the user, new optimized values for the drift parameters are automatically determined from at least one uncorrected or only partially corrected amplitude profile that was stored previously or at the current time, from a corresponding amplitude/time value pair of the measuring signal, or from a signal profile; and said new optimized values for the drift parameters are stored in the memory unit.

2. The method according to claim 1, wherein new values for the drift parameters are determined on the basis of the current values of the drift parameters, using measurement data stored previously or at the current time, and further using test data and/or calibration data.

3. The method according to claim 1, wherein non-corrected or only partially corrected time graphs of the amplitude or amplitude/time value pairs of the measurement signal (ms), or time profiles of the measurement signal, are stored in the performance of measurements during normal operation of at least one of the force-measuring device, in test processes and in calibration processes, with or without the respective time information, whereas time profiles of the measurement signal are recorded when the load is being applied as well as when the load being removed.

4. The method according claim 3, wherein
a) on the basis of the stored signal profiles the magnitude of currently occurring drift phenomena is determined and compared to a corresponding threshold value, and after the threshold value has been found to be exceeded, the method for optimizing the drift parameters is carried out; and
b) the method for the correction of drift phenomena is initiated either by the user or automatically by a time control function.

5. The method according claim 3, wherein at least individual ones of the signal profiles are retrieved from the memory unit and are sequentially delivered to the signal-processing unit in which the correction of drift phenomena takes place based on new values for the drift parameters, whereupon the corrected signal profiles are evaluated and optimized values for the drift parameters are stored in memory.

6. The method according to claim 3, wherein starting from current values for the drift parameters the signal profiles are subjected to a stepwise examination and a test value is subsequently calculated for each step of the examination, optionally after determining the mean value for the measuring results, which test value corresponds to the goodness of the correction, whereupon the values for the drift parameters associated with the best test value are stored as the new current values for the drift parameters.

7. The method according to claim 2, wherein characteristic traits of the force-measuring device are determined which are the result of factors acting on the force-measuring device and/or that characteristic signal profile traits are determined from the signal profiles, based on which characteristic traits the data that are suitable for optimizing the drift parameters are selected and data that are found unsuitable are dropped from further consideration.

8. The method according to claim 6, wherein data that have been accepted by the user are further kept under consideration and/or that no further consideration is given to data:

a) that include a time information associated with a time at which deviations from the normal operating mode of the force-measuring device were recorded,
b) that are associated with periods when extraneous disturbances were recorded, such as mechanical vibrations, atmospheric humidity, irregularities in the line power supply, disturbances caused by air drafts that are either dependent or independent of the load or the measuring object, or temperature-related disturbances,
c) for which load changes were registered that were possibly caused by release or absorption of moisture during the measurement, which may have been determined based on asymmetric drift profiles during application and removal of the load, and/or
d) for which disturbances due to previous measurement applications were registered.

9. The method according to claim 2, wherein an uncorrected or only partially corrected signal profile currently recorded either for applying the load or for both application and removal of the load is confirmed either by the user or automatically by the optimization program as being acceptable for use, and that at the initiation of the user or of the optimization program, new optimized values are determined automatically based on at least the currently recorded signal profile, either for all drift parameters or only for the currently involved drift parameters.

10. The method according to claim 9, wherein the new values of the drift parameters after having been confirmed by the user are stored in the memory unit to replace the previous drift parameters.

11. The method according to claim 1, wherein over the entire operating time of the force-measuring device at least one time profile of uncompensated drift values of the force-measuring device is recorded and a time profile of compensation values associated with said non-compensated drift values is updated and used accordingly for the correction of drift phenomena.

12. A force-measuring device comprising:
a measuring transducer that serves to deliver a measuring signal which is representative of a load applied to the force-measuring device; and
a signal processing unit, said measuring signal being delivered via an analog/digital converter to the signal-processing unit that is supported by at least one processor, said signal-processing unit being capable of compensating drift deviations, for which purpose the processor can access drift parameters that are stored in a memory unit and serve as basis for calculating a time-dependent correction value by which the drift error of the measuring signal can be corrected, the processor being under the control of an optimization program that is stored in the memory unit to, at time intervals that are either controlled automatically or chosen by the user, automatically determine new optimized values for the drift parameters from at least one uncorrected or only partially corrected amplitude profile that was stored previously or at the current time, from a corresponding amplitude/time value pair of the measuring signal, or from a signal profile, said new optimized values for the drift parameters being stored in the memory unit.

13. The force-measuring device according to claim 12, wherein the optimization program executes a method for correction of drift phenomena in an electronic force-measuring device.

14. The force-measuring device according to claim 12, wherein the memory unit is a memory storage medium with read/write capability for storing the signal profiles.

15. The force-measuring device according to claim 12, wherein at least one calibration adjustment weight is provided, by which the force-measuring device can be calibrated and by which a signal profile can be registered based on which new drift parameters can be registered by the optimization program.

16. The force-measuring device according to claim 12, wherein means are provided for at least one of entering the condition of the force-measuring device and initializing a method for correction of drift phenomena in an electronic force-measuring device, means being provided which allow the user to confirm the acceptance of the optimized values for the drift parameters.

17. The force-measuring device according to claim 13, wherein means are provided for at least one of entering the condition of the force-measuring device and initializing a method for correction of drift phenomena in an electronic force-measuring device, means being provided which allow the user to confirm the acceptance of the optimized values for the drift parameters.

18. The force-measuring device according to claim 14, wherein means are provided for at least one of entering the condition of the force-measuring device and initializing a method for correction of drift phenomena in an electronic force-measuring device, means being provided which allow the user to confirm the acceptance of the optimized values for the drift parameters.

19. The force-measuring device according to claim 15, wherein means are provided for at least one of entering the condition of the force-measuring device and initializing a method for correction of drift phenomena in an electronic force-measuring device, means being provided which allow the user to confirm the acceptance of the optimized values for the drift parameters.

20. The method of claim 1, performed in a measuring balance.

21. A system for correction of drift phenomena in an electronic force-measuring device, comprising:
- a computer-readable memory storing drift parameters, signal profiles, and instructions for an optimization program;
- a measuring transducer configured to generate a measuring signal representing a load applied to the force-measuring device
- a signal processing unit including a processor, the signal-processing unit being configured to receive the measuring signal and compensate for drift deviations in the measuring signals based on the drift parameters in the computer-readable memory;
- wherein the instructions for the optimization program, when executed by the processor, cause the processor to perform the steps of:
  - calculating a time-dependent correction value for a measuring signal based on the predetermined drift parameters stored in the computer-readable memory,
  - retrieving from the computer-readable memory at least one signal profile representing an amplitude of a substantially uncorrected measurement signal recorded by the force-measuring device,
  - determining optimized values for the drift parameters from the at least one signal profile, and
  - storing the optimized values for the drift parameters in the computer-readable memory.

* * * * *